United States Patent
Dostert et al.

[11] 3,859,304
[45] Jan. 7, 1975

[54] 6-HALO-1-AMINOMETHYL-1,2,3,4-TETRAHYDROCARBAZOLES

[75] Inventors: Philippe Dostert, Basel; Emilio Kyburz, Reinach, both of Switzerland

[73] Assignee: Hoffmann-La Roche Inc., Nutley, N.J.

[22] Filed: Dec. 21, 1972

[21] Appl. No.: 317,499

[30] Foreign Application Priority Data
Dec. 30, 1971  Switzerland...................... 19237/71

[52] U.S. Cl. .......... 260/315, 424/274, 260/268 TR, 260/268 R, 260/563 R, 260/569
[51] Int. Cl............................................. C07d 27/68
[58] Field of Search...................... 260/315, 268 TR

[56] References Cited
UNITED STATES PATENTS

| | | | |
|---|---|---|---|
| 3,634,420 | 1/1972 | Littell et al. | 260/315 |
| 3,752,823 | 8/1973 | McManus | 260/315 |
| 3,769,298 | 10/1973 | McManus et al. | 260/315 |

OTHER PUBLICATIONS
Chem. & Ind., (1969), 1595–1596, Hath–Brown.
Zhur Obshchei Khim 30: 3108–3111, (1960), Grandberg.
C.A. 55:16546 d, (1961), Grandberg.
J. Med. Chem. 13: 308–311, (Mar. 1970), Rice et al.
C.A. 74:125413 w, (1971), McManus.

*Primary Examiner*—Norma S. Milestone
*Assistant Examiner*—S. D. Winters
*Attorney, Agent, or Firm*—Samuel L. Welt; S. Leon Bernard; William G. Isgro

[57] ABSTRACT

Tetrahydrocarbazoles of the formula

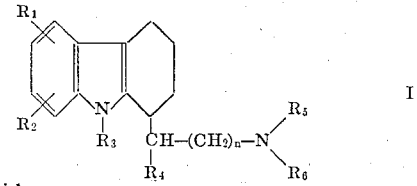

I inter alia antidepressant
wherein $R_1$, $R_2$, $R_3$, $R_4$, $R_5$, $R_6$ and n are as hereinafter set forth, are described. The tetrahydrocarbazoles are prepared interalia by substituting the appropriate basic side chain at position-1 on the correspondingly substituted tetrahydrocarbazole utilizing formaldehyde and an addition salt of the appropriate amine. The end products are useful as antidepresssant agents.

5 Claims, No Drawings

6-HALO-1-AMINOMETHYL-1,2,3,4-TETRAHYDROCARBAZOLES

BRIEF SUMMARY OF THE INVENTION

The invention relates to tetrahydrocarbazoles of the formula

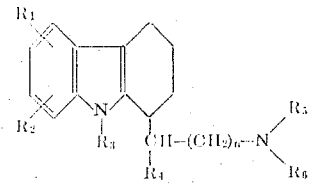

I wherein $R_1$ is hydrogen, halogen, trifluoromethyl, lower alkyl, cyano, hydroxy, lower alkoxy or lower alkythio; $R_2$ is hydrogen or halogen; $R_3$ is hydrogen, lower alkyl or phenyl-lower alkyl; $R_4$ is hydrogen or lower alkyl; $R_5$ and $R_6$, individually, are hydrogen or lower alkyl, or $R_5$ and $R_6$, taken together with the nitrogen to which they are attached, are piperazino, lower alkyl-piperazino, or hydroxy-lower alkyl-piperazino; and $n$ is zero or 1, and addition salts thereof with pharmaceutically acceptable acids.

The compounds of formula I are useful as antidepressant agents.

In another aspect, the invention relatess to novel intermediates of the formulas

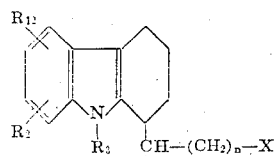

IIa

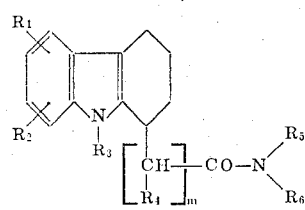

VI

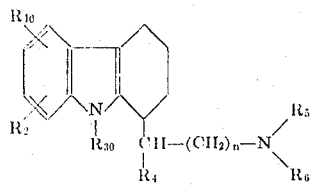

VII and

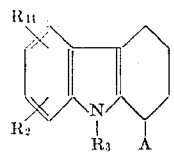

VIII wherein $R_1$ is hydrogen, halogen, trifluoromethyl, lower alkyl, cyano, hydroxy, lower alkoxy or lower alkylthio; $R_2$ is hydrogen or halogen; $R_3$ is hydrogen, lower alkyl or phenyl-lower alkyl; $R_4$ is hydrogen or lower alkyl; $R_5$ and $R_6$, individually, are hydrogen or lower alkyl, or $R_5$ and $R_6$, taken together with the nitrogen to which they are attached, are piperazino, lower alkyl-piperazino, or hydroxy-lower alkylpiperazino; $R_{10}$ is hydrogen, halogen, trifluoromethyl, lower alkyl, cyano, lower alkoxy, lower alkylthio, hydroxy, or hydroxy substituted by a hydrolyzable or hydrogenolyzable protecting group; $R_{11}$ is hydrogen, halogen, trifluoromethyl, lower alkyl, hydroxy, lower alkoxy or lower alkylthio; $R_{12}$ is halogen, trifluoromethyl, lower alkyl, hydroxy, cyano, lower alkoxy or lower alkylthio; $R_{30}$ is lower alkyl, phenyl-lower alkyl or a hydrolyzable or hydrogenolyzable protecting group; X is a leaving group; $n$ is zero or 1; $m$ is zero or 1; and A is a radical of the formula

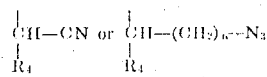

wherein $R_4$ is hydrogen or lower alkyl, and acid addition salts thereof, provided, however, that in the compounds of formula VII, at least one of $R_{10}$ or $R_{30}$ is or bears a protecting group.

DETAILED DESCRIPTION OF THE INVENTION

The invention relates to tetrahydrocarbazoles of the formula

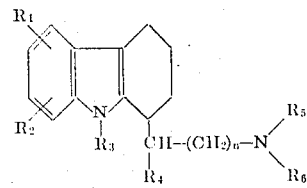

I wherein $R_1$ is hydrogen, halogen, trifluoromethyl, lower alkyl, cyano, hydroxy, lower alkoxy or lower alkylthio; $R_2$ is hydrogen or halogen; $R_3$ is hydrogen, lower alkyl or phenyl-lower alkyl; $R_4$ is hydrogen or lower alkyl; $R_5$ and $R_6$, individually, are hydrogen or lower alkyl, or $R_5$ and $R_6$, taken together with the nitrogen to which they are attached, are piperazino, lower alkyl-piperazino, or hydroxy-lower alkylpiperazino; and $n$ is zero or 1, and addition salts thereof with pharmaceutically acceptable acids.

As used herein, the term "lower alkyl" denotes a straight or branched chain saturated hydrocarbon containing one to seven carbon atoms, for example, methyl, ethyl, propyl, isopropyl, butyl, t-butyl, neopentyl, pentyl, n-hexyl, n-heptyl, and the like. The term "lower alkylthio" denotes an alkyl thioether group in which the lower alkyl group is as described above, for example, methylthio, ethylthio, propylthio, and the like. The term "lower alkoxy" denotes an alkyl ether group in which the lower alkyl group is as described above, for example, methoxy, ethoxy, isopropoxy, propoxy, pentoxy, and the like. The term "halogen" denotes all the halogens, i.e., bromine, chlorine, fluorine and iodine, with chlorine and bromine being preferred.

The compounds of formula I are basic and form acid addition salts, and such salts are also within the scope of this invention. Thus, the compounds of formula I form pharmaceutically acceptable addition salts with, for example, both pharmaceutically acceptable organic and inorganic acids, such as acetic acid, succinic acid, formic acid, methanesulfonic acid, p-toluene-sulfonic acid, hydrochloric acid, nitric acid, phosphoric acid, sulfuric acid and the like. Non-pharmaceutically acceptable acid addition salts of the compounds of formula I above can be converted into pharmaceutically acceptable acid addition salts via conventional metathetic reactions whereby the non-pharmaceutically acceptable anion is replaced by a pharmaceutically acceptable anion; or alternatively, by neutralizing the non-pharamceutically acceptable acid addition salt and then reacting the so-obtained free base with a reagent yielding a pharmaceutically acceptable anion.

A preferred group of tetrahydrocarbazole derivatives of the invention comprises compounds of formula I wherein $R_1$ is halogen or lower alkoxy, lower alkylthio or cyano; $R_2$, $R_3$ and $R_4$ each are hydrogen; $R_5$ is hydrogen or lower alkyl; and $R_6$ is lower alkyl and addition salts thereof with pharmaceutically acceptable acids. Especially preferred tetrahydrocarbazole derivatives are those compounds of formula I wherein $R_1$ is chlorine in the 6-position, $R_2$, $R_3$ and $R_4$ each are hydrogen; $R_5$ is hydrogen, methyl or ethyl; $R_6$ is methyl or ethyl; and n is zero, and addition salts thereof with pharmaceutically acceptable acids.

The most preferred tetrahydrocarbazole derivatives of the invention are the compounds:

6-chloro-1-[(diethylamino)-methyl]-1,2,3,4-tetrahydrocarbazole;
6-chloro-1-[(dimethylamino)-methyl]-1,2,3,4,-tetrahydrocarbazole;
6-chloro-1-[(methylamino)-methyl]-1,2,3,4-tetrahydrocarbazole; and addition salts thereof with pharmaceutically acceptable acids.

The tetrahydrocarbazole derivatives of formula I and their pharmaceutically acceptable acid addition salts are prepared by:

a. reacting a compound of the formula

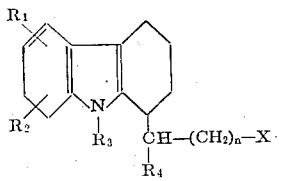

II wherein $R_1$, $R_2$, $R_3$, $R_4$ and n are as previously described and X is a leaving group, with an amine of the formula

III wherein $R_5$ and $R_6$ are as previously described; or b. reacting a compound of the formula

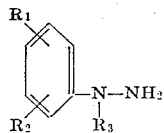

IV wherein $R_1$, $R_2$ and $R_3$ are as previously described, or an acid addition salt thereof with a compound of the formula

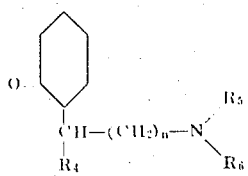

V wherein $R_4$, $R_5$, $R_6$ and n are as previously described, or with an acid addition salt thereof in the presence of a Lewis acid; or c. to prepare a compound of formula I wherein $R_4$ is hydrogen, when n is zero, reducing a compound of the formula

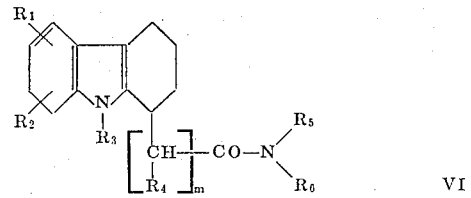

VI wherein $R_1$, $R_2$, $R_3$, $R_4$, $R_5$ and $R_6$ are as previously described and m is 0 or 1; or d. to prepare a compound of formula I wherein $R_1$ is hydroxy and/or $R_3$ is hydrogen, cleaving the protecting group or protecting groups in a compound of the formula

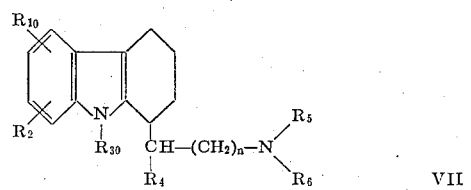

VII wherein $R_2$, $R_4$, $R_5$, $R_6$ and n are as previously described, $R_{10}$ is hydrogen, halogen, trifluoromethyl, lower alkyl, cyano, hydroxy, lower alkoxy or lower alkylthio, except that the hydroxy can be substituted by a hydrolyzable or hydrogenolyzable protecting group, and $R_{30}$ is lower alkyl, phenyl-lower alkyl or hydrolyzable or hydrogenolyzable protecting group, and wherein at least one of $R_{10}$ and $R_{30}$ is or bears a protecting group, or in an acid addition salt thereof; or e. to prepare a compound of formula I wherein $R_1$ is as previously described, except cyano, and $R_5$ and $R_6$, independently, are hydrogen, reducing a compound of the formula

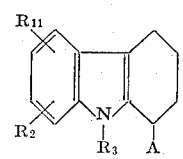

VIII wherein $R_2$ and $R_3$ are as previously described, $R_{11}$ is hydrogen, halogen, trifluoromethyl, lower alkyl, hydroxy, lower alkoxy or lower alkylthio, and A is a radical of the formula

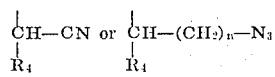

wherein $R_4$ and n are as previously described; or f. to prepare a compound of formula I wherein $R_3$, $R_5$ and $R_6$ each is lower alkyl, treating a compound of the formula

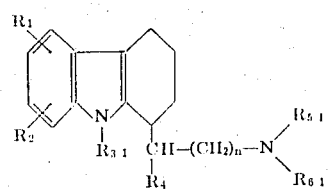

IX wherein $R_1$, $R_2$, $R_4$ and n are as previously described, and one of $R_{31}$, $R_{51}$ and $R_{61}$ is hydrogen and the others are hydrogen or lower alkyl, or an acid addition salt thereof, with a lower alkylating agent; or g. to prepare a compound of formula I wherein $R_4$ is hydrogen and n is zero, reacting a compound of the formula

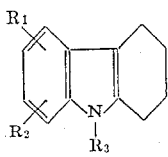

X wherein $R_1$, $R_2$ and $R_3$ are as previously described, or an acid addition salt thereof, with formaldehyde and an acid addition salt of an amine of formula III.

In optional sequence, if desired, replace a chlorine or bromine denoted by $R_1$ and/or $R_2$ by a cyano group in a compound of formula I, if desired, splitting up a racemate obtained into the optical antipodes and, if desired, converting a base obtained into an acid addition salt or converting an acid addition salt obtained into the corresponding base.

The leaving group denoted by X in the starting materials of formula II can conveniently be halogen, preferably, chlorine or bromine, a lower alkanesulfonyloxy, for example, methanesulfonyloxy, or a lower alkylbenzenesulfonyloxy, for example, p-toluenesulfonyloxy or benzenesulfonyloxy.

The starting materials of formula II can be prepared, for example, by reducing a corresponding 1-lower alkoxycarbonyl compound with lithium aluminum hydride and replacing the hydroxy group in the 1-hydroxymethyl compound obtained by a leaving atom or group X in the usual manner. There are thus obtained starting materials of formula II wherein $R_4$ is hydrogen and n is zero. A sulfonylation can be carried out, for example, by reaction with an appropriate sulfonyl chloride, from which the corresponding bromide can be obtained by reaction with, for example, lithium bromide in acetone. On the other hand, a 1-hydroxymethyl compound can be converted by reaction with triphenylphosphine and carbon tetrachloride into a corresponding 1-chloromethyl compound, which can be converted by reaction with sodium iodide or silver fluoride into a corresponding 1-iodomethyl- or 1-fluoromethyl compound of formula II.

Starting materials of formula II wherein $R_4$ is lower alkyl and n is zero are prepared, for example, from a corresponding 1-carboxy compound by treatment with phosphorus pentachloride to give the corresponding acid chloride followed by treatment with an excess of a lower alkyl magnesium halide in the presence of copper and cuprous chloride as the catalyst to give the corresponding 1-(lower alkanoyl) compound. The latter can subsequently be reduced with the aid of lithium aluminum hydride or sodium borohydride to give the corresponding carbinol in which the hydroxy group can be replaced by a leaving group in the manner described earlier.

The side-chain in the 1-position of the starting materials of formula II obtained as described earlier can be lengthened by one carbon atom by treatment with sodium cyanide, for example, in dimethylsulfoxide for several days at slightly elevated temperature, the leaving group X being simultaneously replaced by cyano. The cyano group is converted by hydrolysis, for example, with potassium hydroxide in ethanol, into carboxy which is transformed into hydroxymethyl by reduction with lithium aluminum hydride. The hydroxy group in the thus-obtained 1-hydroxyethyl compound, which may be lower-alkyl-substituted, is replaced by a leaving group in an analogous manner to that described earlier.

The reaction of a starting material of formula II with an amine of formula III in accordance with embodiment (a) of the processes earlier described, is conveniently carried out in an inert organic solvent, for example, benzene, toluene, xylene or a lower alkanol such as methanol or ethanol. The temperature is not critical, but conveniently, the reaction is carried out at a temperature in the range of from about 20°C. to about 150°C. The reaction can be carried out at atmospheric pressure as well as at elevated pressure, for example, at about 20 atmospheres. Conveniently, the reaction is carried out in the presence of a proton acceptor, such as an alkali metal carbonate, for example, sodium carbonate, or a tertiary amine, for example, triethylamine or diisopropylethylamine. The amine of formula III can also serve as the proton acceptor, in which case it is used in excess.

In the reaction of a compound of formula IV with a compound of formula V in accordance with embodiment (b) of the processes earlier described, there is first formed the corresponding hydrazone which cyclizes to the desired compound of formula I after the addition of a Lewis acid. As the Lewis acid there can be used, for example, a lower alkanecarboxylic acid, such as acetic acid, boron trifluoride, aluminum trichloride, aluminum tribromide or tin tetrachloride. The reaction is readily carried out in the absence of a solvent. However, it can, if desired, also be carried out in an organic solvent, for example, a lower alkanol. The temperature is not critical. Conveniently, the reaction can be carried out at between room temperature and the boiling point of the reaction mixture.

The starting materials of formula VI can be prepared, for example, from the corresponding 1-lower alkoxycarbonyl compounds. These can be converted into the corresponding 1-carboxy compounds by hydrolysis, for example, by treatment with ethanolic potassium hydroxide. The 1-carboxy compounds can be converted by treatment with phosphorus pentachloride into the corresponding acid chlorides which yield starting materials of formula VI wherein $m$ is zero after the addition of an amine of formula III. For the preparation of a starting material of formula VI wherein $m$ is 1 and $R_4$ is hydrogen, the earlier-mentioned 1-lower alkoxycarbonyl compound can be converted by reduction with lithium aluminum hydride into a corresponding 1-hydroxymethyl compound which, after treatment with, for example, tosyl chloride, yields the corresponding 1-tosyloxymethyl compound. The latter can be converted by treatment with sodium cyanide into a corresponding 1-cyanomethyl compound. By hydrolysis with, for example, ethanolic potassium hydroxide, there is obtained the corresponding 1-carboxymethyl compound which can be converted, in the manner described earlier, with phosphorus pentachloride and an amine of formula III into the corresponding starting material of formula VI wherein $m$ is 1 and $R_4$ is hydrogen.

For the preparation of a starting material of formula VI wherein m is 1 and $R_4$ is lower alkyl, a corresponding 1-carboxy compound can be treated with phosphorus pentachloride and subsequently with an excess of a lower alkyl magnesium halide in the presence of copper and cuprous chloride. The 1-(lower alkanoyl) compound obtained can be converted with the aid of lithium aluminum hydride into the corresponding carbinol. The latter can subsequently be treated with tosyl chloride and the tosyloxy compound obtained can be converted by treatment with sodium cyanide to the corresponding cyano compound. The cyano compound can readily be hydrolyzed by treatment with, for example, ethanolic potassium hydroxide, to give the corresponding carboxy compound. The 1-[α-(lower alkyl)-carboxymethyl] compound obtained can be treated with phosphorus pentachloride and subsequently with an amine of formula III to give a starting material of formula VI wherein m is 1 and R$_4$ is lower alkyl.

One mode of carrying out the reduction of a starting material of formula VI in accordance with embodiment (c) of the processes earlier described comprises treating said starting material with lithium aluminum hydride. This reduction is conveniently carried out in an inert solvent, for example, ether or tetrahydrofuran. The temperature is not critical. Conveniently, the reduction is carried out at a temperature in the range of from about room temperature to about the boiling point of the mixture. In place of lithium aluminum hydride, there can be used (lower alkoxy)-aluminum hydrides, for example, bis(ethoxy)-aluminum hydride, or alkali metal (lower alkoxy)-aluminum hydrides, for example, tris(ethoxy)-lithium aluminum hydride or sodium dihydro-bis(2-methoxyethoxy)-aluminate. According to yet another method of carrying out the reduction, a starting material of formula VI is treated with diborane. This reduction is similarly carried out in an inert solvent, for example, tetrahydrofuran or the like. The reduction of the compounds of formula VI is conveniently carried out at a temperature in the range of from about 0°C. to about room temperature.

The introduction of a protecting group on the nitrogen atom in the 9-position or on a hydroxy group in the aromatic nucleus, which is effected with respect to starting materials of formula VII serves for the prevention of undesired substitution in the synthesis of compounds of formula I wherein R$_1$ is hydroxy and/or R$_3$ is hydrogen. Examples of hydrolyzable protecting groups which can be present are lower alkanesulfonyl, such as mesyl; benzenesulfonyl; lower alkylbenzenesulfonyl, such as tosyl; lower alkanoyl groups such as acetyl; benzoyl; and tri(lower alkyl)-silyl, such as trimethylsilyl. Examples of hydrogenolyzable protecting groups are benzyl and phenyl-(lower alkoxycarbonyl) such as benzyloxycarbonyl.

The protecting groups can be introduced in a known manner, for example, by reaction with an appropriate functional derivative thereof, for example, a chloride. The protecting group is chosen according to the conditions prevailing in the synthesis and according to the conditions employed earlier or later in the synthesis, partly to prevent undesirable substitution in the 9-position or on a hydroxy moiety of R$_1$ and partly to prevent the protecting group from being prematurely cleaved under the conditions prevailing during the synthesis.

The cleavage of the protecting groups R$_{10}$ and/or R$_{30}$ from a starting material of formula VII in accordance with embodiment (d) of the processes earlier described is carried out in a known manner. The cleavage of a substituted-sulfonyl, lower alkanoyl, benzyl or tri(lower alkyl)-silyl group can be carried out by treatment with a hydrolyzing agent. For example, a substituted sulfonyl, lower alkanoyl or benzyl group is cleaved by treatment at a temperature in the range of from about room temperature to about the boiling point of the mixture with an aqueous alkali metal hydroxide. The lower alkylsilyl is cleaved merely by treatment with water.

The benzyl and phenyl-(lower alkoxycarbonyl) groups can be cleaved from a starting material of formula VII by treatment with catalytically activated hydrogen. As the catalysts there can be used, for example, palladium, Raney-nickel, platinum or ruthenium. This cleavage is conveniently carried out in an inert solvent such as water, lower alkanol, for example, methanol or ethanol, organic acid, for example, acetic acid, or the like, dimethylformamide, tetrahydrofuran or dimethylsulfoxide. The temperature at which this treatment is carried out conveniently is in the range of from about 0°C. to about 80°C.

The preparation of the starting materials of formula VIII wherein A is cyanomethyl is carried out, for example, by converting the corresponding 1-lower alkoxycarbonyl compound by treatment with lithium aluminum hydride into the corresponding 1-hydroxymethyl compound which, after treatment with tosyl chloride and subsequent treatment of the 1-tosyloxy-methyl compound obtained with sodium cyanide, yields the corresponding 1-cyanomethyl compound of formula VIII.

Starting materials of formula VIII wherein A is the radical

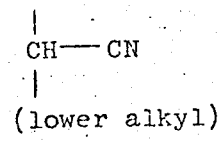

are prepared, for example, by converting the corresponding 1-carboxy compound into an acid chloride using phosphorus pentachloride, treating the acid chloride with an excess of a lower alkyl magnesium halide in the presence of copper and copper chloride, reacting the resulting 1-(lower alkanoyl) compound with lithium aluminum hydride, reacting the carbinol obtained with tosyl chloride in pyridine and treating the resulting tosyloxy compound with sodium cyanide.

Starting materials of formula VIII wherein A is the radical

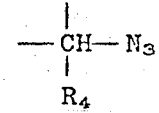

wherein R$_4$ is as earlier described, can be prepared by reacting the corresponding tosyloxy compound with sodium azide. Starting materials of formula VIII wherein A is the radical

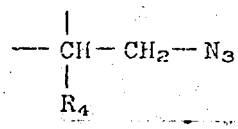

wherein R$_4$ is as earlier described, can be prepared by hydrolyzing the aforementioned compounds of formula VIII wherein A is the radical

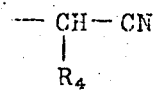

wherein R₄ is as earlier described, with, for example, ethanolic potassium hydroxide, reducing the resulting carboxy compound with lithium aluminum hydride, converting the hydroxymethyl compound so obtained with tosyl chloride into the tosyloxymethyl compound and treating the latter compound with sodium azide.

The reduction of the starting materials of formula VIII in accordance with embodiment (e) of the processes earlier described is carried out using lithium aluminum hydride, conveniently in the presence of an inert solvent such as tetrahydrofuran, dioxane, ether, dimethylformamide or dimethylsulfoxide. The reduction is preferably carried out at a temperature in the range of from about room temperature to about 80°C. In place of lithium aluminum hydride there can also be used a complex thereof with an aluminum halide, for example, aluminum chloride. By this reduction there is obtained the corresponding primary amine of formula I, i.e., a compound of formula I wherein $R_5$ and $R_6$ each is hydrogen.

The alkylation of a starting material of formula IX in accordance with embodiment (f) of the present processes earlier described, is preferably carried out by treatment with a lower alkyl halide such as methyl iodide, chloride or bromide, for example, in an inert organic solvent such as dimethylformamide or dimethylsulfoxide. The temperature is not critical. Conveniently, the reaction is carried out at a temperature in the range of from about room temperature to about the boiling point of the mixture. Advantageously, a base such as an alkali metal hydride, for example, sodium hydride, or a Grignard compound, for example, a lower alkyl magnesium halide such as methyl magnesium bromide or chloride, can be added.

The reaction of a starting material of formula X with formaldehyde and an acid addition salt of an amine of formula III in accordance with embodiment (g) of the processes earlier described, takes place by means of a Mannich reaction. Conveniently, the reaction is carried out in the presence of an inert solvent such as a lower alkanol, for example, methanol or ethanol, or a lower alkanecarboxylic acid, for example, acetic acid. The reaction is conveniently carried out in the presence of a hydrohalic acid, for example, hydrochloric acid. The reaction is carried out at a temperature in the range of from about room temperature to about the boiling point of the reaction mixture, preferably at the reflux temperature.

A chlorine or bromine defined by $R_1$ in the compounds of formula I can be replaced by a cyano group by reaction with cuprous cyanide in pyridine. The reaction is preferably carried out at elevated temperature, for example, at a temperature in the range of from about 50°C. to about the boiling point of the reaction mixture. Conveniently, the reaction is carried out in the presence of dimethylformamide. In order to liberate the nitrile from the cuprous halogenide complex, the reaction mixture is treated with an alkali metal cyanide, ethylenediamine or an aqueous ferric halide solution, for example, a ferric chloride solution.

The aforementioned methods for the introduction of cyano defined by $R_1$ can also be used in the preparation of starting materials of formulas II, IV, VII, IX and X. Since the cyano group is sensitive to reducing and hydrolyzing agents, it is advisable in the case of preparative routes which make use of such agents, to introduce the cyano group defined by $R_1$ only after carrying out such reductions or hydrolyses.

In the preparation of starting materials of formulas II, IV, VI, VIII, IX and X wherein $R_1$ is hydroxy, this group is conveniently protected, for example, by reaction with benzyl chloride. The benzyl group can be cleaved in the usual manner; for example, by treatment with hydrogen and a noble metal catalyst such as palladium-carbon.

The compounds of formula I possess an asymmetric center at the carbon in the 1-position and accordingly form optical isomers. A racemate of formula I can be separated in the usual manner, for instance, by reacting the base with an optically active acid, for example (+)- or (−)-tartaric acid, (+)- or (+)-0,0-dibenzoyltartaric acid, (−)- or (+)-α-bromo-camphorsulfonic acid or the like. The mixture of the two optical isomers can be separated by repeated fractional crystallization into the (+) and (−) antipodes. The optical isomers can also be prepared from the corresponding optically active starting materials of formulas II, V, VI, VII, VIII or IX.

As earlier discussed, the compounds of formula I form acid addition salts with inorganic acids and with organic acids. The preferred acid addition salts are the hydrohalides, especially the hydrochlorides. The acid addition salts are conveniently prepared in a suitable solvent such as acetone or tetrahydrofuran, by treatment of the pure base with an equivalent amount of a corresponding anhydrous acid. The acid addition salts are mostly crystalline and can be recrystallized from suitable solvents, for example, acetone/methanol.

To prepare the compounds of formula I from corresponding acid addition salts, the latter are dissolved in water and made alkaline, preferably with an inorganic base such as an alkali metal hydroxide, an alkali metal carbonate or the like. The compounds of formula I so obtained separate out and can be extracted using an inorganic solvent such as ether, chloroform, methylene chloride or the like.

The compounds of formula I are solid, crystalline substances which are soluble in ether, benzene, methanol, ethanol or the like and in chlorinated hydrocarbons such as chloroform or methylene chloride, and are relatively insoluble in water.

The acid addition salts of the compounds of formula I are likewise crystalline solid substances. They are soluble in dimethylsulfoxide and dimethylformamide (to some extent also in water) and only slightly soluble or insoluble in methanol, ethanol, benzene, petroleum ether or chlorinated hydrocarbons, such as chloroform and methylene chloride.

The tetrahydrocarbazoles of formula I and their addition salts with pharmaceutically acceptable acids are characterized by their activity on the nervous system, especially by their antidepressant activity. The antidepressant activity of the compound of formula I can be demonstrated as follows:

The test compound is administered p.o. to groups of five rats in three doses each comprising 50 mg/kg. (twice on the preceding day and once on the day of experiment). Six hours after the latter administration, the rats are injected subcutaneously with 20 mg/kg. of 2-hydroxy-2-ethyl-3-isobutyl-9,10-dimethoxy-1,2,3,4,6,7-hexahydro-11bH-benzo[a]-quinolizine hydrochloride. The same dose is administered to a group of 5 rats which have not been previously treated with the derivative. The estimation embraces central and peripheral symptoms such as are characteristic for tricyclic antidepressives [see Ann. N.Y. Acad. Sci. 96, 279 (1962)]. Specifically, the motility (climbing), susceptibility to stimulation, seeking behavior, as well as the suppression of ptosis are observed. These changes are expressed in numbers according to an evaluation scheme.

The compounds listed in Table I hereinafter demonstrate, in the described test, a strong antidepressive action which manifests itself in strongly increased, characteristic motility, susceptibility to stimulation, seeking behavior as well as complete suppression of ptosis. The percentages given are based on the value obtained with amitriptyline (amtitriptyline = 100 percent).

Table I

| Compound | Activity in Percent of the Activity of Amitriptyline |
| --- | --- |
| 6-Chloro-1-[(diethylamino)methyl]-1,2,3,4-tetrahydrocarbazole | 200 |
| 6-Chloro-1-[(dimethylamino)methyl]-1,2,3,4-tetrahydrocarbazole | 220 |
| 6-Chloro-1-[(methylamino)methyl]-1,2,3,4-tetrahydrocarbazole | 190 |

The significantly low toxicity of the compounds of formula I is illustrated by Table II hereinafter (the results are based on 24-hour values in mice):

Table II

| Compound | $DL_{50}$ mg/kg. p.o |
| --- | --- |
| 6-Chloro-1-[(diethylamino)methyl]-1,2,3,4-tetrahydrocarbazole | 1250–2500 |
| 6-Chloro-1-[(dimethylamino)methyl]-1,2,3,4-tetrahydrocarbazole | 600–1200 |
| 6-Chloro-1-[(methylamino)methyl]-1,2,3,4-tetrahydrocarbazole | 1250–2500 |

The tetrahydrocarbazole derivatives provided by this invention can be used as medicaments; for example, in the form of pharmaceutical preparations which contain them in association with one or more compatible pharmaceutical carriers. Such carriers include organic or inorganic inert carrier materials suitable for enteral (e.g., oral) or parenteral administration such as for example, water, gelatin, lactose, starch, magnesium stearate, talc, vegetable oils, gum arabic, polyalkylene glycols, and the like. The pharmaceutical preparations can be made up in solid form, for example, as tablets, dragees, suppositories or capsules, or in liquid form, for example, as solutions, suspensions or emulsions. If necessary, they can be sterilized and/or can contain additive materials such as preserving, stabilizing, wetting or emulsifying agents, salts for varying the osmotic pressure, or buffers. They can also contain other therapeutically effective materials.

Convenient pharmaceutical dosage forms contain about 1 to 200 mg. of a compound of formula I. Convenient oral dosage ranges lie at about 0.1 mg/kg. per day to about 5 mg/kg. per day. For example, a dosage form of 10–40 mg. can be administered three times per day. Convenient parenteral dosage ranges lie at about 0.01 mg/kg. per day to about 0.5 mg/kg. per day. However, the aforementioned ranges can be varied in either direction depending on individual requirements of the warm-blooded animal being treated, and are exemplary.

The following Examples further illustrate the invention. All temperatures are in degrees Centigrade, unless otherwise mentioned.

EXAMPLE 1

Preparation of 6-chloro-1[(diethylamino)methyl]-1,2,3,4-tetrahydrocarbozole hydrochloride 10 g. of lithium aluminum hydride are suspended in 300 ml. of absolute ether. Then, a solution of 52.6 g. of 6-chloro-1,2,3,4-tetrahydro-N,N-diethylcarbazole-1-carboxamide in 600 ml. of absolute tetrahydrofuran is added dropwise. The reaction mixture is heated at reflux for 3 hours and thereafter cooled and cautiously hydrolyzed with ethyl acetate and water. After vacuum filtration over Kieselguhr, the two phases are separated and the aqueous solution extracted three times with ether. The combined organic phases are dried over sodium sulfate and then evaporated. The residual 6-chloro-1[(diethylamino)methyl]-1,2,3,4-tetrahydrocarbazole is taken up in ethanol and treated with hydrogen chloride in ethanol. Upon evaporation, the substance crystallizes. After recrystallization from acetone/methanol, the crystalline 6-chloro-1[diethylamino)methyl]-1,2,3,4-tetrahydrocarbazole hydrochloride melts at 228°–230°C.

The 6-chloro-1,2,3,4-tetrahydro-N,N-diethylcarbazole-1-carboxamide used above can be prepared as follows:

15 g. of 6-chloro-1,2,3,4-tetrahydrocarbazole-1-carboxylic acid are dissolved in 360 ml. of absolute ether and cooled to −10°C. Then, 17.1 g. of phosphorus pentachloride are added in one portion and the reaction mixture is stirred for 2 hours at −5°C. to +10°C. Subsequently, 26 g. of diethylamine in 70 ml. of absolute ether are added dropwise at the same temperature. The obtained solution is cooled to room temperature and stirred overnight. Then, the solution is hydrolyzed with water. The resulting ethereal phase is separated and the aqueous phase extracted three times with methylene chloride. The ether is evaporated and treated with methylene chloride. The combined organic phases are washed with a saturated sodium carbonate solution, dried over sodium sulfate and evaporated, to yield 6-chloro-1,2,3,4-tetrahydro-N,N-diethylcarbazole-1-carboxamide which melts at 192°–194°C.

In an analogous manner, utilizing the procedure of Example 1, the following compounds can be prepared:
1. from 6-chloro-1,2,3,4-tetrahydro-N,N-dimethylcarbazole-1-carboxamide,
   6-chloro-1[(dimethylamino)methyl]-1,2,3,4-tetrahydrocarbazole hydrochloride, having a melting point of 242°–244°C., was obtained;
2. from 6-chloro-1,2,3,4-tetrahydro-N-methylcarbazole-1-carboxamide,
   6-chloro-1,2,3,4-tetrahydro-1[(methylamino)-methyl]-carbazole cyclohexanesulfamate, having a melting point of 204°–206°C. was obtained;
3. from 1-methyl-4-[(6-chloro-1,2,3,4-tetrahydrocarbazole-1-yl)-carbonyl]-piperazine,
   6-chloro-1,2,3,4-tetrahydro-1[(4-methyl-1-piperazinyl)-methyl]carbazole dihydrochloride, having a melting point of 272°–274°C. was obtained;

4. from 6-chloro-1,2,3,4-tetrahydrocarbazole-1-carboxamide,
1-(aminomethyl)-6-chloro-1,2,3,4-tetrahydrocarbazole hydrochloride, having a melting point of 209°–212°C. was obtained;
5. from 7-chloro-1,2,3,4-tetrahydro-N,N-dimethylcarbazole-1-carboxamide,
7-chloro-1[(dimethylamino)methyl]-1,2,3,4-tetrahydrocarbazole hydrochloride, having a melting point of 207°–209°C. was obtained;
6. from 5,7-dichloro-1,2,3,4-tetrahydro-N,N-dimethylcarbazole-1-carboxamide,
5,7-dichloro-1-[(dimethylamino)methyl]-1,2,3,4-tetrahydrocarbazole hydrochloride, having a melting point of 250°–252°C. was obtained;
7. from 5,7-dichloro-1,2,3,4-tetrahydro-N,N-diethylcarbazole-1-carboxamide,
5,7-dichloro-1-[(diethylamino)methyl]-1,2,3,4-tetrahydrocarbazole hydrochloride, having a melting point of 231°–233°C. was obtained;
8. from 6-methyl-1,2,3,4-tetrahydro-N,N-dimethylcarbazole-1-carboxamide,
1-[(dimethylamino)methyl]-1,2,3,4-tetrahydro-6-methylcarbazole hydrochloride, having a melting point of 240°–242°C. was obtained;
9. from 6-methoxy-1,2,3,4-tetrahydro-N,N-dimethylcarbazole-1-carboxamide,
1-[(dimethylamino)methyl]-1,2,3,4-tetrahydro-6-methylcarbazole hydrochloride, having a melting point of 199°–201°C. was obtained;
10. from 6-methoxy-1,2,3,4-tetrahydro-N,N-diethylcarbazole-1-carboxamide,
1-[(diethylamino)methyl]-1,2,3,4-tetrahydro-6-methoxy-carbazole hydrochloride, having a melting point of 162°–164°C. was obtained;
11. from 1-methyl-4-[(6-methoxy-1,2,3,4-tetrahydrocarbazole-1-yl)-carbonyl]-piperazine,
1,2,3,4-tetrahydro-6-methoxy-1-](4-methyl-1-piperazinyl)-methyl]carbazole dihydrochloride, having a melting point of 262°–264°C. was obtained;
12. from 6-fluoro-1,2,3,4-tetrahydro-N,N-dimethylcarbazole-1-carboxamide,
1-[(dimethylamino)methyl]-6-fluoro-1,2,3,4-tetrahydrocarbazole hydrochloride, having a melting point of 209°–211°C. was obtained;
13. from 6-bromo-1,2,3,4-tetrahydro-N,N-dimethylcarbazole-1-carboxamide,
6-bromo-1-[(dimethylamino)methyl]-1,2,3,4-tetrahydrocarbazole hydrochloride, having a melting point of 254°–256°C. was obtained;
14. from 6-(methylthio)-1,2,3,4-tetrahydro-N,N-dimethylcarbazole-1-carboxamide,
1-[(dimethylamino)methyl]-1,2,3,4-tetrahydro-6-(methylthio)carbazole hydrochloride, having a melting point of 198°–200°C. was obtained;
and 15. from 6-(methylthio)-1,2,3,4-tetrahydro-N,N-diethylcarbazole-1-carboxamide,
1-[(diethylamino)methyl]-1,2,3,4-tetrahydro-6-(methylthio)carbazole cyclohexanesulfamate, having a melting point of 162°–164°C. was obtained.

The amide starting materials reacted above can be prepared as described in Example 1 above. Utilizing that procedure, the following amides were prepared:
1. from 6-chloro-1,2,3,4-tetrahydrocarbazole-1-carboxylic acid,
6-chloro-1,2,3,4-tetrahydro-N,N-dimethylcarbazole-1-carboxamide, haivng a melting point of 250°–252°C. was obtained;
2. from 6-chloro-1,2,3,4-tetrahydrocarbazole-1-carboxylic acid,
6-chloro-1,2,3,4-tetrahydro-N-methylcarbazole-1-carboxamide, having a melting point of 124°–126°C. was obtained;
3. from 6-chloro-1,2,3,4-tetrahydrocarbazole-1-carboxylic acid,
1-methyl-4-[(6-chloro-1,2,3,4-tetrahydrocarbazole-1-yl)carbonyl]-piperazine, having a melting point of 213°–215°C. was obtained;
4. from 6-chloro-1,2,3,4-tetrahydrocarbazole-1-carboxylic acid,
6-chloro-1,2,3,4-tetrahydrocarbazole-1-carboxamide, having a melting point of 181°–183°C. was obtained;
5. from 7-chloro-1,2,3,4-tetrahydrocarbazole-1-carboxylic acid,
7-chloro-1,2,3,4-tetrahydro-N,N-dimethylcarbazole-1-carboxamide, having a melting point of 243°–245°C. was obtained;
6. from 5,7-dichloro-1,2,3,4-tetrahydrocarbazole-1-carboxylic acid,
5,7-dichloro-1,2,3,4-tetrahydro-N,N-dimethylcarbazole-1-carboxamide, having a melting point of 296°–298°C. was obtained;
7. from 5,7-dichloro-1,2,3,4-tetrahydrocarbazole-1-carboxylic acid,
5,7-dichloro-1,2,3,4-tetrahydro-N,N-diethylcarbazole-1-carboxamide, having a melting point of 212°–215°C. was obtained;
8. from 6-methyl-1,2,3,4-tetrahydrocarbazole-1-carboxylic acid,
6-methyl-1,2,3,4-tetrahydro-N,N-dimethylcarbazole-1-carboxamide, having a melting point of 267°–269°C. was obtained;
9. from 6-methoxy-1,2,3,4-tetrahydrocarbazole-1-carboxylic acid,
6-methoxy-1,2,3,4-tetrahydro-N,N-dimethylcarbazole-1-carboxamide, having a melting point of 202°–204°C. was obtained;
10. from 6-methoxy-1,2,3,4-tetrahydrocarbazole-1-carboxylic acid,
6-methoxy-1,2,3,4-tetrahydro-N,N-diethylcarbazole-1-carboxamide, having a melting point of 181°–183°C. was obtained;
11. from 6-methoxy-1,2,3,4-tetrahydrocarbazole-1-carboxylic acid,
1-methyl-4-[(6-methoxy-1,2,3,4-tetrahydrocarbazole-1-yl)carbonyl]piperazine, having a melting point of 157°–159°C. was obtained;
12. from 6-fluoro-1,2,3,4-tetrahydrocarbazole-1-carboxylic acid,
6-fluoro-1,2,3,4-tetrahydro-N,N-dimethyl-carbazole-1-carboxamide, having a melting point of 221°–223°C. was obtained;
13. from 6-bromo-1,2,3,4-tetrahydrocarbazole-1-carboxylic acid,
6-bromo-1,2,3,4-tetrahydro-N,N-dimethylcarbazole-1-carboxamide, having a melting point of 264°–266°C. was obtained;
14. from 6-(methylthio)-1,2,3,4-tetrahydrocarbazole-1-carboxylic acid, 6-(methylthio)-1,2,3,4-tetrahydro-N,N-dimethylcarbazole-1-carboxamide, having a melting point of 242°–244°C. was obtained; and 15. from 6-(methylthio)-1,2,3,4-tetrahydrocarbazole-1-carboxylic acid, 6-(methylthio)-1,2,3,4-tetrahydro-N,N-diethylcarbazole-1-carboxamide, having a melting point of 215°–217°C. was obtained.

EXAMPLE 2

Preparation of 6-chloro-1-[2-(dimethylamino)-ethyl]-1,2,3,4-tetrahydrocarbazole hydrochloride 7 g. of lithium aluminum hydride are suspended in 100 ml. of absolute ether. Then, a solution of 15.9 g. of 6-chloro-1,2,3,4-tetrahydro-N,N-dimethylcarbazol-1-acetamide in 200 ml. of absolute tetrahydrofuran is added dropwise. The resulting reaction mixture is heated at reflux for 2 hours, cooled and cautiously hydrolyzed with ethyl acetate and water. After vacuum filtration over Kieselguhr, the two phases are separated and the aqueous solution extracted twice with ether. The organic solutions are combined, dried over sodium sulfate and evaporated. The residual 6-chloro-1-[2-(dimethylamino)ethyl]-1,2,3,4-tetrahydrocarbazole is taken up in ethanol and treated with a solution of hydrochloric acid in ethanol to yield 6-chloro-1-[2-(dimethylamino)ethyl]-1,2,3,4-tetrahydrocarbazole hydrochloride, which separates in crystalline form and melts at 197°–199°C. after recrystallization from acetone/methanol.

In an analogous manner there is prepared:
from 6-chloro-1,2,3,4-tetrahydro-N-methylcarbazol-1-acetamide,
6-chloro-1,2,3,4-tetrahydro-1-[2-(methylamino)ethyl]-carbazole hydrochloride, having a melting point of 228°–230°C.

The 6-chloro-1,2,3,4-tetrahydro-N,N-dimethylcarbazol-1-acetamide used as the starting material above can be prepared as follows:

7.6 g. of lithium aluminum hydride are suspended in 200 ml. of absolute ether. Then, 52 g. of 6-chloro-1,2,3,4-tetrahydrocarbazole-1-carboxylic acid ethyl ester in 400 ml. of absolute ether are added dropwise at room temperature. Thereafter, the resulting solution is heated at reflux for 2 hours, cooled well and cautiously hydrolyzed with ethyl acetate and water. After vacuum filtration over Kieselguhr, the two phases are separated and the aqueous solution extracted twice with ether. The combined organic solutions are dried over sodium sulfate and concentrated. The residue crystallizes and after recrystallization from isopropyl ether yields 6-chloro-1,2,3,4-tetrahydrocarbazole-1-methanol which melts at 57°–59°C.

37.2 g. of 6-chloro-1,2,3,4-tetrahydrocarbazole-1-methanol are dissolved in 64 g. of pyridine. The solution is cooled to 0°C. and treated over a 1 hour period with 38 g. of p-toluene-sulfonyl chloride. The solution is stirred for an additional hour at 0°C. and left to stand overnight in a refrigerator. The reaction mixture is then poured over ice and extracted with chloroform. The chloroform solution is washed with 3-N aqueous hydrochloric acid, with water and subsequently with a saturated sodium carbonate solution and dried over sodium sulfate. After evaporation of the solvent, the residue is recrystallized from methylene chloride/petroleum ether (40°–45°C.) to yield 6-chloro-1,2,3,4-tetrahydrocarbazole-1-methyltosylate which melts at 137°–139°C.

15 g. of sodium cyanide are suspended in 300 ml. of absolute dimethyl sulfoxide. To the resulting suspension, a solution of 59 g. of 6-chloro-1,2,3,4-tetrahydrocarbazole-1-methyltosylate in 300 ml. of dimethyl sulfoxide is added dropwise, and the mixture is stirred for 48 hours at 60°–65°C. This reaction mixture is poured over ice and extracted with ether. The ethereal phase is washed three times with water. After drying over sodium sulfate, the solvent is removed under reduced pressure and the residue filtered through a 20-fold amount of aluminum oxide (activity grade II) with benzene to yield 6-chloro-1,2,3,4-tetrahydrocarbazol-1-acetonitrile which melts at 168°–170°C. after recrystallization from methylene chloride/petroleum ether (40°–45°C.).

A solution of 34.5 g. of 6-chloro-1,2,3,4-tetrahydrocarbazole-1-acetonitrile and 29 g. of potassium hydroxide in 130 ml. of ethanol and 65 ml. of water is heated at reflux for 48 hours with stirring. The resulting solution, after evaporation of the solvent and addition of water, is extracted with ether. The aqueous phase is made acidic and the 6-chloro-1,2,3,4-tetrahydrocarbazol-1-acetic acid obtained is taken up in ether and dried over sodium sulfate. After evaporation, the residue is recrystallized from isopropyl ether to yield 6-chloro-1,2,3,4-tetrahydrocarbazol-1-acetic acid which melts at 138°–140°C.

A solution of 15 g. of 6-chloro-1,2,3,4-tetrahydrocarbazol-1 -acetic acid in 60 ml. of absolute tetrahydrofuran is treated with stirring, with 5.7 g. of triethylamine and subsequently stirred for an additional half hour at room temperature. After cooling to 0°C., 7.8 g. of chloroformic acid isobutyl ester in 30 ml. of absolute tetrahydrofuran is introduced dropwise, and after maintaining the temperature at 0°C. for 1 hour, 14.6 g. of dimethylamine are also introduced. Stirring is continued for an additional 2 hours at 0°C. and overnight at room temperature. The solvent is evaporated and the residue partitioned between water and chloroform. The organic solution is washed with aqueous sodium carbonate solution, dried over sodium sulfate and concentrated, whereby the residual 6-chloro-1,2,3,4-tetrahydro-N,N-dimethylcarbazol-1-acetamide crystallizes and has a melting point of 190°–192°C. After recrystallization from methylene chloride/petroleum ether (40°–45°C).

If methylamine is used, in place of dimethylamine in the preceding paragraph, an analogous starting material, 6-chloro-1,2,3,4-tetrahydro-N-methylcarbazol-1-acetamide, is obtained.

EXAMPLE 3

Preparation of 8-[(dimethylamino)methyl]-5,6,7,8-tetrahydrocarbazol-3-ol hydrochloride 4 g. of 6-(benzyloxy)-1-[(dimethylamino)methyl]-1,2,3,4-tetrahydrocarbazole hydrochloride are dissolved in 200 ml. of absolute methanol and hydrogenated overnight in the presence of 0.8 g. of 5 percent palladium/carbon. After vacuum filtration, the solution is evaporated and the solid substance recrystallized from methanol to yield 8-[(dimethylamino)methyl]-5,6,7,8-tetrahydrocarbazol-3-ol hydrochloride, which melts at 268°–270°C.

The 6-(benzyloxy)-[(dimethylamino)methyl]-1,2,3,4-tetrahydrocarbazole hydrochloride used as the starting material can be prepared in a manner analogous to that described in Example 1, so that there is obtained from 6-(benzyloxy)-1,2,3,4-tetrahydrocarbazole-1-carboxylic acid, 6-(benzyloxy)-1,2,3,4-tetrahydro-N,N-dimethylcarbazole-1-carboxamide, having a melting point of 195°–197°C. which is transformed into 6-(benzyloxy)-1-[(dimethylamino)-methyl]-1,2,3,4-tetrahydrocarbazole hydrochloride, having a melting point of 213°–215°C.

EXAMPLE 4

Preparation of 6-chloro-1-[(dimethylamino)methyl]-1,2,3,4-tetrahydro-9-methylcarbazole hydrochloride 3 g. of sodium hydride (50 percent in oil) are suspended in 50 ml. of absolute dimethylformamide. 14 g. of 6-chloro-1-[(dimethylamino)methyl]-1,2,3,4-tetrahydrocarbazole in 80 ml. of absolute dimethylformamide are added dropwise thereto and the mixture is stirred for 3 hours at room temperature. After cooling to 0°C., a solution of 7.8 g. of methyl iodide in 50 ml. of absolute dimethylformamide is slowly added dropwise. After stirring for an additional 2 hours, the solvent is evaporated under reduced pressure and the residue partitioned between water and chloroform. The aqueous phase is extracted twice with chloroform and the combined chloroform solutions are dried over sodium sulfate. After evaporation of the solvent, the residue is filtered on a 20-fold amount of aluminum oxide (activity grade II) with benzene as the solvent to yield 6-chloro-1-[(dimethylamino)methyl]-1,2,3,4-tetrahydro-9-methylcarbazole which is taken up in absolute ethanol. The solution is made Congo-acid with a 28 percent hydrogen chloride solution in ethanol to yield 6-chloro-1-[(dimethylamino)methyl]-1,2,3,4-tetrahydro-9-methylcarbazole hydrochloride, which separates in crystalline form and melts at 278°–280°C. after recrystallization from acetone/methanol.

In an analogous manner, utilizing the procedure of Example 4, the following compounds can be prepared:
1. from 6-chloro-1-[(dimethylamino)methyl]-1,2,3,4-tetrahydrocarbazole and benzyl chloride, 9-benzyl-6-chloro-1-[(dimethylamino)methyl]-1,2,3,4-tetrahydrocarbazole hydrochloride, having a melting point of 258°–260°C. was obtained;
2. from 5,7-dichloro-1-[(dimethylamino)methyl]-1,2,3,4-tetrahydrocarbazole and methyl iodide, 5,7-dichloro-1-[(dimethylamino)methyl]-1,2,3,4-tetrahydro-9-methylcarbazole hydrochloride, having a melting point of 272°–274°C. was obtained;
3. from 5,7-dichloro-1-[(diethylamino)methyl]-1,2,3,4-tetrahydrocarbazole and methyl iodide, 5,7-dichloro-1-[(dimethylamino)methyl]-1,2,3,4-tetrahydro-9-methylcarbazole hydrochloride, having a melting point of 250°–252°C. was obtained;
4. from 1-[(diethylamino)methyl]-1,2,3,4-tetrahydro-6-methoxycarbazole and methyl iodide, 1-[(diethylamino)methyl]-1,2,3,4-tetrahydro-6-methoxy-9-methylcarbazole hydrochloride, having a melting point of 202°–204°C. was obtained;
5. from 6-bromo-1-[(dimethylamino)methyl]-1,2,3,4-tetrahydrocarbazole and methyl iodide, 6-bromo-1-[(dimethylamino)methyl]-1,2,3,4-tetrahydro-9-methylcarbazole hydrochloride having a melting point of 276°–278°C. was obtained; and
6. from 8-[(dimethylamino)methyl]-5,6,7,8-tetrahydrocarbazole-3-carboxylic acid nitrile and methyl iodide, 8-[(dimethylamino)methyl]-5,6,7,8-tetrahydro-9-methylcarbazole-3-carboxylic acid nitrile hydrochloride, having a melting point of 287°–289°C. was obtained.

EXAMPLE 5

Preparation of 8-[(dimethylamino)-methyl]-5,6,7,8-tetrahydrocarbazole-3-carboxylic acid nitrile hydrochloride 60 g. of 6-bromo-1-[(dimethylamino)methyl]-1,2,3,4-tetrahydrocarbazole are treated with 27 g. of cuprous cyanide in 200 ml. of dimethylforamide and 30 ml. of pyridine. After boiling at reflux for 6 hours, the hot solution is introduced dropwise into a warm solution of 50 g. of sodium cyanide in 300 ml. of water and stirred vigorously until all passes into solution. The solution is extracted with chloroform and the solvent evaporated under reduced pressure. The resulting residue is taken up in benzene, washed with a 10 percent sodium cyanide solution and subsequently with water and dried over sodium sulfate. After evaporation of the solvent, the residue is filtered on a 20-fold amount of aluminum oxide (activity grade II) with benzene as the solvent to yield in part the starting material and in part the desired 8-[(dimethylamino)-methyl]-5,6,7,8-tetrahydrocarbazole-3-carboxylic acid nitrile, which is taken up in ethanol and is treated with a dry stream of hydrogen chloride. The 8-[(dimethylamino)-methyl]-5,6,7,8-tetrahydrocarbazole-3-carboxylic acid nitrile hydrochloride, which separates in crystalline form, melts at 291°–293°C. after recrystallization from acetone/methanol.

EXAMPLE 6

Preparation of 1,2,3,4-tetrahydro-1-[(4-methyl-1-piperazinyl)-ethyl]carbazole dihydrochloride If 1-[(1,2,3,4-tetrahydrocarbazol-1-yl)acetyl]-4-methyl-piperazine is employed in Example 2 in place of 6-chloro-1,2,3,4-tetrahydro-N,N-dimethylcarbazol-1-acetamide, then there is obtained 1,2,3,4-tetrahydro-1-[(4-methyl-1-piperazinyl)ethyl]-carbazole dihydrochloride which melts at 279°–281°C.

The starting material is prepared from 1,2,3,4-tetrahydrocarbazole-1-carboxylic acid ethyl ester in the same manner as given in Example 2, 1-methylpiperazine being employed in place of dimethylamine.

EXAMPLE 7

Preparation of (+)-6-chloro-1-[(diethylamino)-methyl]-1,2,3,4-tetrahydorcarbazole hydrochloride and (−)-6-chloro-1(diethylamino)methyl]-1,2,3,4-tetrahydrocarbazole hydrochloride 23.7 g. of 6-chloro-1-[(diethylamino)methyl]-1,2,3,4-tetrahydrocarbazole are treated with 12.21 g. of D(+)-tartaric acid in 300 ml. of acetone. The precipitated salt is repeatedly recrystallized from methanol, until the optical rotation of the salt no longer increases, and is then treated by the addition of an aqueous sodium carbonate solution to yield (+)-6-chloro-1-[(diethylamino)-methyl]-1,2,3,4-tetrahydrocarbazole; $[\alpha]_{Hg}^{364} = +100°$ (c = 0.5 percent in methanol). Treatment of the base with ethanolic hydrochloric acid, gives (+)-6-chloro-[(diethylamino)-methyl]-1,2,3,4-tetrahydrocarbazole hydrochloride, which melts at 215°–217°C. $[\alpha]_{Hg}^{364} = +47°$ ($c = 0.5$ percent in methanol).

The first mother-liquor which contains mainly the (−)-antipode, is concentrated and then converted to the corresponding base by treatment with an aqueous sodium carbonate solution. The base is then treated with D(+)-dibenzoyltartaric acid and the precipitated salt is repeatedly recrystallized from methanol until the optical rotation of the salt no longer increases, and is then treated by the addition of an aqueous sodium carbonate solution to yield (−)-6-chloro-1-[(diethylamino)-methyl]-1,2,3,4-tetrahydrocarbazole; $[\alpha]_{Hg}^{364} = -87°$ ($c = 0.1$ percent in methanol). The (−)-6-chloro-1-[(diethylamino)-methyl]-1,2,3,4-tetrahydrocarbazole hydrochloride melts at 213°–215°C. $[\alpha]_{Hg}^{364} = -39°$ ($c = 1.0$ percent in methanol).

The following Examples illustrate pharmaceutical preparations containing the tetrahydrocarbazole derivatives of the invention:

EXAMPLE 8

Preparation of capsules of the following formula:

| | |
|---|---|
| 6-Chloro-1-[(diethylamino)methyl]-1,2,3,4-tetrahydrocarbazole | 10 mg. |
| Mannitol | 110 mg. |
| Talc | 5 mg. |
| | 125 mg. |

The active ingredient, i.e., 6-chloro-1-[(diethylamino)-methyl]-1,2,3,4-tetrahydrocarbazole, is homogeneously mixed with the talc and mannitol, passed through a sieve No. 5 (mesh width about 0.23 mm) and again thoroughly mixed. The mixture obtained is filled into gelatin capsules No. 4.

EXAMPLE 9

Preparation of dragees of the following formula:

| | |
|---|---|
| 6-Chloro-[(dimethylamino)methyl]-1,2,3,4-tetrahydrocarbazole | 25 mg. |
| Mannitol | 100 mg. |
| Maize starch | 20 mg. |
| Talc | 5 mg. |
| | 150 mg. |

The active ingredient, i.e., 6-chloro-1-[(dimethylamino)-methyl]-1,2,3,4-tetrahydrocarbazole, is mixed with mannitol and passed through a sieve No. 5 (mesh width about 0.23 mm). A 10 percent aqueous paste is prepared from the maize starch and homogeneously mixed with the mannitol/active ingredient mixture. The slightly moist mass is passed through a sieve No. 2 (mesh width about 1.0 mm). The granulate obtained is dried and, after addition of the talc, pressed to biconvex nuclei with a weight of 150 mg. The nuclei can be covered with a sugar layer in the usual manner by drageeing.

EXAMPLE 10

The compounds of the formula

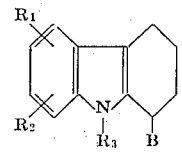

wherein $R_1$, $R_2$ and $R_3$ are as previously described, and B is carboxy or lower alkoxycarbonyl, which are utilized to prepare the starting materials of formulas II, VI and VIII, are known compounds or can be prepared according to known procedures in the art. Similarly, the compounds of formula X are known compounds or can be prepared according to known procedures in the art.

We claim:

1. A compound of the formula

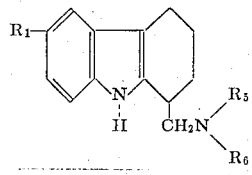

wherein $R_1$ is halogen, $R_5$ is hydrogen or lower alkyl and $R_6$ is lower alkyl, or addition salts thereof with pharmaceutically acceptable acids.

2. A compound, in accordance with claim 1, of the formula

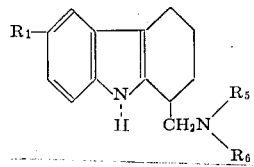

wherein $R_1$ is chlorine, $R_5$ is hydrogen, methyl or ethyl and $R_6$ is methyl or ethyl, or addition salts thereof with pharmaceutically acceptable acids.

3. A compound in accordance with claim 2, 6-chloro-1-[(diethylamino)methyl]-1,2,3,4-tetrahydrocarbazole or addition salts thereof with pharmaceutically acceptable acids.

4. A compound in accordance with claim 2, 6-chloro-1-[(dimethylamino)methyl]-1,2,3,4-tetrahydrocarbazole or addition salts thereof with pharmaceutically acceptable acids.

5. A compound in accordance with claim 2, 6-chloro-1-[(methylamino)methyl]-1,2,3,4-tetrahydrocarbazole or addition salts thereof with pharmaceutically acceptable acids.

* * * * *